Jan. 13, 1959     A. DE ANGELIS     2,868,074
OPHTHALMIC MOUNTINGS
Filed Jan. 17, 1955
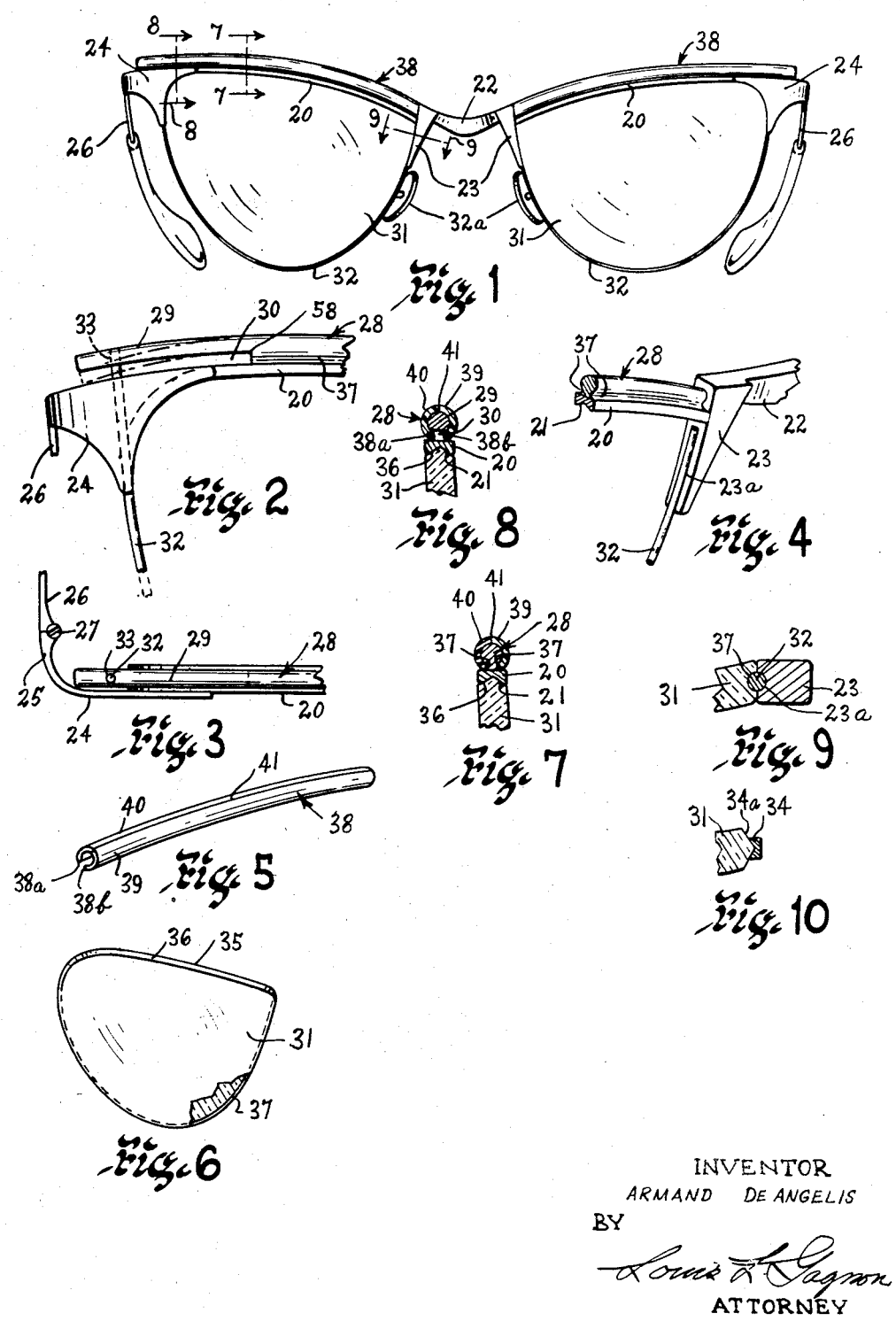
INVENTOR
ARMAND DE ANGELIS
BY
ATTORNEY

United States Patent Office 2,868,074
Patented Jan. 13, 1959

2,868,074

OPHTHALMIC MOUNTINGS

Armand De Angelis, Southbridge, Mass., assignor to American Optical Company, Southbridge, Mass., a voluntary association of Massachusetts Application January 17, 1955, Serial No. 482,112

4 Claims. (Cl. 88—47)

This invention relates to improvements in ophthalmic mountings and has particular reference to improved means of supporting a pair of lenses therein.

It is a major object of this invention to provide a lens supporting structure for the lenses of an ophthalmic mounting wherein simple and efficient means is provided for quickly and precisely attaching said lenses to said supporting structure or removing same therefrom without the use of special tools or the like.

Another object is to provide an ophthalmic mounting of the above character with lens supporting means embodying a self-conforming portion which is adapted to respond to a tension pull to intimately engage the peripheral edges of the lenses to be mounted therein and which will properly support the lenses in position of use regardless of slight irregularities in size or contour shape thereof which often occurs in the fabrication of such lenses.

Another object is to provide an ophthalmic mounting comprising resilient lens suspension means which are adapted to provide a substantially uniform, predetermined tension along the peripheral edge of the lens to be mounted therein so as to eliminate isolated points of strain.

Another object is to provide an ophthalmic mounting of the above character comprising means for engaging the peripheral edges of a pair of lenses so as to securely attach said lenses to said mounting, said means having relatively fine thread portions shaped to partially fit within grooves provided in adjacent portions of the peripheral edges of the lenses and being so correlated therewith as to be substantially invisible when the mounting is viewed from the front, said thread portions further functioning as protective means for said peripheral edges.

Another object is to provide a lens supporting structure of the character described which is designed for use either with or without decorative trims and being further designed to detachably receive said trims.

Another object is to provide a mounting of the above character with decorative trims which further function to aid in retaining the lenses in the mounting.

Other objects and advantages of the invention will become apparent from the following description taken in conjunction with the accompanying drawings, and it will be apparent that many changes may be made in the details of construction and arrangement of parts shown and described without departing from the spirit of the invention as expressed in the accompanying claims. I, therefore, do not wish to be limited to the exact details of construction and arrangement of parts shown and described as the preferred forms only have been given by way of illustration.

Referring to the drawings:

Fig. 1 is a front elevational view of the mounting embodying the invention;

Fig. 2 is an enlarged fragmentary front elevational view of a temporal portion of the mounting illustrated in Fig. 1 with the lens and decorative trim removed therefrom;

Fig. 3 is a fragmentary top plan view of the portion of the mounting shown in Fig. 2;

Fig. 4 is a fragmentary perspective view of a nasal portion of the mounting with the lens and trim removed therefrom;

Fig. 5 is a perspective view of a trim for use with said mounting;

Fig. 6 is a front elevational view of a lens to be used in conjunction with the above mounting and showing a portion of said lens broken away;

Fig. 7 is an enlarged cross-sectional view taken substantially on line 7—7 of Fig. 1;

Fig. 8 is an enlarged cross-sectional view taken substantially on line 8—8 of Fig. 1;

Fig. 9 is an enlarged cross-sectional view taken on line 9—9 of Fig. 1; and

Fig. 10 is an enlarged cross-sectional view generally similar to Fig. 9 but showing an alternatively shaped eyewire or strand portion.

Referring more particularly to the drawings wherein like characters of reference designate like parts throughout the several views, the mounting embodying the invention comprises a pair of rim portions 20, formed of metal or other suitable material, having V-shaped lens receiving grooves 21 formed in the undersides thereof as shown in Figs. 4 and 7. The rim portions 20 are joined at the nasal ends thereof by a bridge 22 having depending side portions 23 soldered or otherwise secured to the respective ends of said portions 20. The opposed ends of the portions 20 are further soldered or otherwise connected to conventional endpieces or the like 24 which are formed with rearwardly extending portions 25, as shown in Fig. 3, to which a pair of temples 26 are attached by means of conventional hinge connections or the like 27. These correlated parts are considered to be the main lens supporting structure of the mounting.

Bar-like members 28 are secured by means of solder or the like to the upper transverse portions of the rim portions 20 with the nasal ends thereof located adjacent the depending portions 23 of the bridge 22. The opposed ends of said bar-like members 28 are provided with relatively free functioning spring end portions 29, Figs. 2 and 3, which are spaced from the adjacent rim portions by a cutaway area 30 provided on the underside of said bar-like members.

It is to be pointed out that the bar-like members are formed of a suitable spring-like material such as spring steel, beryllium copper or the like to allow the end portions 29 to be urged downwardly against the adjacent ends of the rim portions for an operation to be described more in detail hereinafter.

In order to support a pair of spectacle lenses 31 within the mounting, a pair of flexible lens retaining wires, or cords of nylon or other suitable material, hereinafter referred to as fine eyewires 32, are soldered or otherwise secured at one end thereof within semicircular grooves 23a provided in the depending side portions 23 of bridge 22, Figs. 4 and 8, whereupon the opposed ends of said eyewires 32 are soldered or otherwise secured within openings 33 provided in the spring end portions 29 of bar-like members 28 as shown in Figs. 2 and 3. The inner ends 58 of the spring portions 29, in this instance, function as the points of attachment of the eyewires to the main lens supporting structure and the spring section 29 thereby functions as resilient means between said attached ends of the eyewires to said supporting structure to permit expansion of the lens receiving openings between said eyewires 32 and said rim portions 20.

It will be noted that the eyewires 32, in this case, are circular in cross section but may be of any other desirable shape such as shown in Fig. 10, for example, wherein a conventional relatively thin flexible V grooved eyewire 34 generally similar to rim portions 20 is illustrated. Said eyewire 34, however, would be much smaller in cross-sectional area than that of rim portions 20 so as to permit greater flexibility thereof and would be adapted to engage a portion of a beveled edge 34a provided upon a lens to be inserted therein. It is to be further noted that the eyewires 32, rim portions 20 and bar-like members 28 may be formed to any shape desired so as to correspond to the contour of the lenses to be used therewith. All of the eyewires have a degree of flexibility which is such that they will be self-conforming to the contour shapes of the portions of the lenses with which they engage.

The nasal sides of the rim portions 20 or bridge 22 are provided with conventional adjustable nose bearing pads 32a which may be rigidly or loosely connected with pad supporting arms attached to said rim portions or bridge by solder or the like as shown in Fig. 1.

Referring more particularly to Fig. 6, wherein a typical lens shape is illustrated for use with the above described mounting, it is pointed out that the upper transverse edge 35 of the lens 31 is provided with a V shaped bevel 36 adapted to fit within the V grooves 21 of rim portions 20, as shown in Fig. 7, whereas the remaining peripheral edge of said lens 31 is provided with a semicircular groove 37. The cross-sectional shape of the grooves is of a radius substantially that of the cross-sectional area of eyewires 32 so as to receive the mounting as shown in Fig. 8.

In order to position the lenses 31 within the mounting, the spring end portions 29 of bar-like members 28 are forced downwardly against the spring tension thereof, to a position substantially as shown by dot-dash lines in Fig. 2. By so doing, the eyewires 32, being attached or otherwise anchored to the bridge 22 and to the spring end portions 29, are caused to expand the opening within the rim portions 20 and said eyewires 32 to readily allow the lenses 31 to be fitted therein.

With the eyewires 32 in the above opened position, the transverse upper bevels 36 of the lenses 31 are fitted within the V grooves 21 of rim portions 20, as shown in Figs. 7 and 8, and the lenses 31 are then aligned so as to receive the eyewires in the grooves 37. This takes place upon release of the spring end portions 29 which will cause said flexible eyewires 32 to be drawn upwardly to yieldingly engage in the grooves 37.

Since, as described above, the eyewires 32 and the rim portions 20 are shaped so as to interfit with the grooves 37 and bevels 36 respectively of lenses 31, the spring tension in the spring end portions 29 will cause the lenses 31 to be yieldably retained within the mounting as shown in Fig. 1.

It is to be pointed out that in the manufacture of ophthalmic lenses, slight variations in contour and/or shape dimension may occur, however, since the eyewires 32 are of the flexible type and the spring end portions 29 are so constructedd as to position and retain the eyewires 32 in intimate relation with all points along the grooved edges of the lenses 31, it can be seen that a uniform tension will be maintained at all times upon the edges of said lenses with little if any localized strain being imparted to said lenses.

It is to be further pointed out that the tension upon the lenses may be controlled by variations in the length of the cutaway area 30, the size of the cross-sectional area of the spring end portions 29 or by proper selection of the type of metal or material used to form the bar-like member 28.

When the lenses 32 are properly positioned within the mounting as shown in Fig. 1 it can be seen that the eyewires 32 are barely visible since approximately only one half of said eyewires lie within the semicircular lens grooves 37 thereby giving a contrasting effect to the heavier upper brow or rim portions of the mounting and providing said mounting with a semi-rimless appearance. Due to the fact that said eyewires extend outwardly beyond the contour edges of the lenses they will act as shock absorbing or cushioning means to prevent breakage of said lenses when the edges thereof are placed in engagement with a hard surface.

Removal of lenses 31 from the mounting may be accomplished by depressing the spring end portions 29 to a position substantially as shown by dot-dash lines in Fig. 2 so as to cause the flexible eyewires 32 to be forced in a direction outwardly of the lens grooves 37 thereby enabling said lenses 31 to be readily removed from the mounting.

The bar-like members 28 as shown best in Figs. 2, 3, 4, 7 and 8 are, in this case, substantially circular in cross section and are so secured to the upper transverse portions of the rim portions 20 that inwardly extending channels 37 are formed on the opposed sides thereof between the lower sides of said bar-like members and the upper transverse portions of the lens rims so as to receive suitable decorative trims or the like 38.

The decorative trims 38, one of which is illustrated in Fig. 5, are formed of two semicylindrical sections 39 and 40, preferably of different colors, joined with each other by a suitable adhesive or the like along their upper meeting edges 41, Figs. 5, 7 and 8 with the lower edges thereof being spaced relative to each other to provide a longitudinal slot 21 extending throughout their length and which is adapted to straddle the solder joint of the bar-like member 28 with the upper surface of the rim portions 20, when slid endwise or snapped onto said bar-like member 28 and with the spaced edges 38a and 38b fitting within the side channels 37 so as to be clampingly retained on said bar-like member 28 by the inherent resiliency of the material of said trims 38 which may be metal or plastic or combinations thereof. With the trims 38 in position upon the mounting, as shown in Figs. 1, 7 and 8, it can be seen in Fig. 8 that the spring end portions 29 of bar-like members 28 are contained within the trims 38 and that the spaced edges 38a and 38b of said trims 38 are positioned around the undersides of said spring-like members 29 so as to prevent accidental depression or movement thereof and that trims 38 must be entirely removed from the mounting in order to operate said spring-like members 29.

It is to be understood, however, that said decorative trims may also be constructed as a single piece of extruded material or the like and that they may be provided with differently shaped outer or inner surfaces and that the bar-like member 28 may also be provided with differently shaped outer surfaces to receive the various shaped trims mentioned above.

From the foregoing description it will be seen that simple, efficient and economical means have been provided for accomplishing all of the objects and advantages of the invention.

I claim:

1. An ophthalmic mounting comprising a main lens supporting structure embodying a bridge member having rim portions extending outwardly of the opposed sides thereof and terminating in temporal end members to which temples may be attached, said rim portions being adapted to overlie the upper edge portions of the lenses and having a groove on the undersurfaces thereof to receive said upper edge portions of the lenses, bar-like members secured throughout the major portion of their lengths to the upper surfaces of said rim portions so as to provide a main portion of a given cross-section and opposed inwardly extending channels throughout the major portion of the length of said bar-like members and rim portions and having an integral resilient temporal end portion extending outwardly of and spaced from said rim portion to permit free flexing of said temporal end portion in an upward or downward direction, said barlike member being adapted to receive decorative trims thereon in the form of members having a tubular-like portion having an internal bore shaped to fit the cross-sectional shape of the bar-like members and having a longitudinal slot therein with its opposed edges adapted to fit within the opposed channels and beneath said resilient temporal end portion to restrict the flexing of said end portion when in position thereon, said supporting structure further embodying eyewire portions of less cross-sectional size than said rim portions each adapted to encircle the sides and lower contour edge of each lens when assembled therewith and being self-conforming to said contour edges of said lenses, each of said eyewires having one of its ends secured to the supporting structure adjacent the bridge and its opposed end secured adjacent the outer end of said integral resilient temporal end portion of the barlike member for permitting expansion of said eyewire portions with respect to said rim portions in response to downward flexing of said resilient temporal end portions for increasing the openings within said rim portions and said eyewire portions for placement of lens in said openings and with said resilient temporal end portions thereafter being adapted to cause the interengaging portions of said eyewires and said rim portions to resiliently grip and hold the lenses in said openings.

2. An ophthalmic mounting comprising a main lens supporting structure embodying a bridge having rim portions extending outwardly of the opposed sides thereof and terminating in temporal end members to which temples may be attached, said rim portions being adapted to overlie the upper edge portions of the lenses with one of said portions having a groove to receive the other of said portions, said rim portions each having a barlike member secured to the upper surface thereof throughout the major portion of the length of said upper surface and having outwardly extending resilient portions on the temporal sides of said rim portions and spaced therefrom by an amount to permit flexing said resilient portions in a direction toward and away from said rim portions, and eyewire portions of less cross-sectional size than said rim portions adapted to encircle the remaining contour portions of the lenses and being self-conforming to the shape of said contour portions, one of said latter eyewire and contour portions being grooved to receive the other of said portions, each of said eyewire portions having one end thereof secured to the main lens supporting structure adjacent the bridge and having its opposed end secured adjacent the outer end of the resilient end portion of the barlike member whereby downward flexing of said resilient end portion will permit expansion of the opening within said rim portion and said eyewire portion for ease in placement of a lens in said opening and upon releasing said downward flexing of said resilient portion and the tendency thereof to return to its initial set being adapted to cause the interfitting portions of the eyewires and rims with the contour edge of the lens to resiliently grip and hold the lens in said opening.

3. An ophthalmic mounting comprising a main lens supporting structure embodying a bridge having rim portions extending outwardly of the opposed sides thereof and terminating in temporal end members to which temples may be attached, said rim portions being adapted to overlie the upper edge portions of the lenses with one of said portions having a groove to receive the other of said portions, each of said rim portions having a barlike member secured to the upper surface thereof throughout the major portion of the length of said upper surface, said barlike members having integral outwardly extending resilient portions on the temporal sides of said rim portions and spaced from said rim portions by an amount to permit flexing said resilient portions in an upward or downward direction relative to said rim portions, eyewire portions of less cross-sectional size than said rim portions adapted to encircle the remaining contour portions of the lenses and being self-conforming to the shapes of said contour portions, one of said latter eyewire and contour portions being grooved to receive the other of said portions, each of said eyewire portions having one end thereof secured to the main lens supporting structure adjacent the bridge and having its opposed end secured adjacent the outer end of the resilient end portion of the barlike member whereby downward flexing of said resilient end portion will permit expansion of the opening within said rim portion and said eyewire portion for ease in placement of a lens in said opening and upon releasing said downward flexing of said resilient portion and the tendency thereof to return to its initial set being adapted to cause the interfitting portions of the eyewires and rims with the contour edge of the lens to resiliently grip and hold the lens in said opening, said barlike members being adapted to receive detachable trims and, when positioned thereon, said trims having portions fitting beneath said outwardly extending resilient end portions to prevent downward flexing thereof after the lens has been fitted within the opening.

4. An ophthalmic mounting comprising a main lens supporting structure embodying a bridge having rim portions extending outwardly of the opposed sides thereof and terminating in temporal end members to which temples may be attached, said rim portions being adapted to overlie the upper edge portions of the lenses with one of said portions having a groove to receive the other of said portions, said rim portions each having a barlike member secured to the upper surface thereof throughout the major portion of the length of said upper surface and having a relatively long bar-springlike resilient portion extending outwardly of the temporal side of said rim portion and spaced therefrom by an amount to permit flexing said resilient portion in an upward or downward direction relative to said rim portion, and eyewire portions of less cross-sectional size than said rim portions adapted to encircle the remaining contour portion of the lens and being self-conforming to the shape of said contour portion, one of said latter eyewire and contour portions being grooved to receive the other of said portions, each of said eyewire portions having one end thereof secured to the main lens supporting structure adjacent the bridge and having its opposed end secured adjacent the outer end of the resilient end portion of the barlike member whereby downward flexing of said resilient end portion will permit expansion of the opening within said rim portion and said eyewire portion for ease in placement of a lens in said opening and upon releasing said downward flexing of said resilient portion and the tendency thereof to return to its initial set being adapted to cause the interfitting portions of the eyewires and rims with the contour edge of the lens to resiliently grip and hold the lens in said opening.

References Cited in the file of this patent

UNITED STATES PATENTS

| Number | Name | Date |
| --- | --- | --- |
| 500,014 | Lazarus | June 20, 1893 |
| 2,329,100 | Chappell | Sept. 7, 1943 |
| 2,516,549 | Chappell | July 25, 1950 |
| 2,554,386 | Rohrbach | May 22, 1951 |
| 2,566,236 | Meddoff | Aug. 28, 1951 |
| 2,599,463 | Lamb | June 3, 1952 |
| 2,696,756 | Salierno | Dec. 14, 1954 |

FOREIGN PATENTS

| Number | Country | Date |
| --- | --- | --- |
| 18,692 | Great Britain | of 1893 |
| 22,036 | Great Britain | of 1906 |
| 428,481 | France | June 22, 1911 |
| 1,015,976 | France | Aug. 13, 1952 |